(12) United States Patent
Hurley

(10) Patent No.: US 11,713,133 B2
(45) Date of Patent: Aug. 1, 2023

(54) FRANGIBLE ATTACHMENT FOR FUEL LINE SURVIVABILITY

(71) Applicant: Bombardier Inc., Dorval (CA)

(72) Inventor: Sonny Z. Hurley, Montreal (CA)

(73) Assignee: Bombardier Inc.

(*) Notice: Subject to any disclaimer, the term of this patent is extended or adjusted under 35 U.S.C. 154(b) by 622 days.

(21) Appl. No.: 16/837,519

(22) Filed: Apr. 1, 2020

(65) Prior Publication Data

US 2020/0317363 A1 Oct. 8, 2020

Related U.S. Application Data

(60) Provisional application No. 62/827,935, filed on Apr. 2, 2019.

(51) Int. Cl.
| | |
|---|---|
| *B64D 37/00* | (2006.01) |
| *B64D 37/32* | (2006.01) |
| *F16L 3/137* | (2006.01) |
| *F16L 3/123* | (2006.01) |
| *F16L 3/015* | (2006.01) |

(52) U.S. Cl.
CPC ........... *B64D 37/32* (2013.01); *B64D 37/005* (2013.01); *F16L 3/015* (2013.01); *F16L 3/1233* (2013.01); *F16L 3/137* (2013.01)

(58) Field of Classification Search
CPC ....... B64D 37/32; B64D 37/005; F16L 3/015; F16L 3/1233; F16L 3/137
See application file for complete search history.

(56) References Cited

U.S. PATENT DOCUMENTS

| | | | | |
|---|---|---|---|---|
| 2,339,093 | A * | 1/1944 | Metheny | H02G 3/32 174/40 CC |
| 2,470,309 | A * | 5/1949 | Hepp | B25B 23/00 29/270 |
| 4,006,874 | A * | 2/1977 | McGee | F16L 3/123 248/55 |
| 4,063,334 | A * | 12/1977 | Rohman | F16L 3/1236 24/619 |
| 4,177,352 | A | 12/1979 | Dunbar et al. | |
| 5,330,139 | A * | 7/1994 | Tietje | F16L 3/1233 248/65 |
| 5,730,402 | A * | 3/1998 | Sallen | F16L 3/133 248/74.1 |
| 6,508,442 | B1 * | 1/2003 | Dolez | F16L 3/1233 248/74.1 |

(Continued)

*Primary Examiner* — Nkeisha Smith
(74) *Attorney, Agent, or Firm* — Fishman Stewart PLLC

(57) ABSTRACT

A support assembly may include a support structure and a P-clamp attached to the support structure. The P-clamp may include a clamp body defining an opening, a mounting base structured and arranged to engage the support structure, and a connecting section interconnecting the clamp body and the mounting base. The P-clamp may be arranged in an inverted upright position where the mounting base is attached to the support structure underneath the clamp body relative to a direction of gravity. The P-clamp may yield at the connecting section upon an application of a load for to the clamp body that is equal to or greater than a predetermined applied load three threshold. The support assembly may be useful in an aircraft fuel line installation for supporting a fuel line from the support structure.

19 Claims, 6 Drawing Sheets

(56) References Cited

U.S. PATENT DOCUMENTS

| | | | |
|---|---|---|---|
| 7,137,606 B2* | 11/2006 | Conway | F16L 3/015 |
| | | | 248/220.22 |
| 8,894,023 B2* | 11/2014 | Dann | F16L 3/243 |
| | | | 248/62 |
| 8,905,693 B2* | 12/2014 | Coffland | F16B 43/00 |
| | | | 411/525 |
| 9,441,663 B2 | 9/2016 | Coffland et al. | |
| 9,551,437 B2 | 1/2017 | Defrance | |
| 9,592,919 B2* | 3/2017 | Leachman | B64C 29/0033 |
| 10,668,878 B1* | 6/2020 | Sampson | B60R 16/08 |
| 11,274,771 B2* | 3/2022 | Geppert | F16L 3/00 |
| 2015/0291290 A1* | 10/2015 | Leachman | B64C 29/0033 |
| | | | 248/74.1 |
| 2016/0318624 A1* | 11/2016 | Skibba | B64D 45/02 |
| 2022/0316647 A1* | 10/2022 | Kramer | F16L 59/187 |

\* cited by examiner

FRANGIBLE ATTACHMENT FOR FUEL LINE SURVIVABILITY

CROSS-REFERENCE TO RELATED APPLICATIONS

This application claims priority to U.S. Provisional Patent Application No. 62/827,935, filed on Apr. 2, 2019, the contents of which are hereby incorporated in its entirety.

TECHNICAL FIELD

The present disclosure relates generally to securing components to support structures, and more particularly to a support assembly and a frangible attachment for supporting a fluid conduit (e.g., a fuel line) from a support structure such as an aircraft structure.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some installations require a failure mechanism for the attachment of various components and systems to a structure. An example of such installations include aircraft fuel lines, where there is a grave concern about an aircraft fire due to the rupture of the fuel lines following a survivable crash event. Damaged fuel lines frequently cause spillage in aircraft accidents. Fuel lines may be cut by surrounding structure or worn through by chafing rough surfaces. The current airworthiness standards for fuel lines installed on a transport aircraft (14 CFR § 25.993(f)) requires that each fuel line within the fuselage of the aircraft must be designed and installed to allow a reasonable degree of deformation and stretching without leakage. This allows the fuel line to shift and displace with collapsing structure. Aviation authorities have indicated that a certain displacement of a conduit in a guillotine-like test is acceptable to show compliance with such requirement.

Fuel lines may be secured with frangible connections (e.g., frangible clamps or fasteners) that break apart and release the fuel line upon a high impact load. However, such frangible connections may be prone to premature failure when subject to normal environmental and operational loads imposed on the mechanism.

Improvements to aircraft installations which comply with airworthiness standards for fuel lines installed on transport category aircraft for survivable crash events are therefore still needed.

According to the present disclosure, there is provided a frangible (e.g., deformable) attachment and a support assembly for supporting a fluid conduit (e.g., a fuel line) from a support structure, as set forth in the appended claims.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

DETAILED DESCRIPTION

Figure 1:
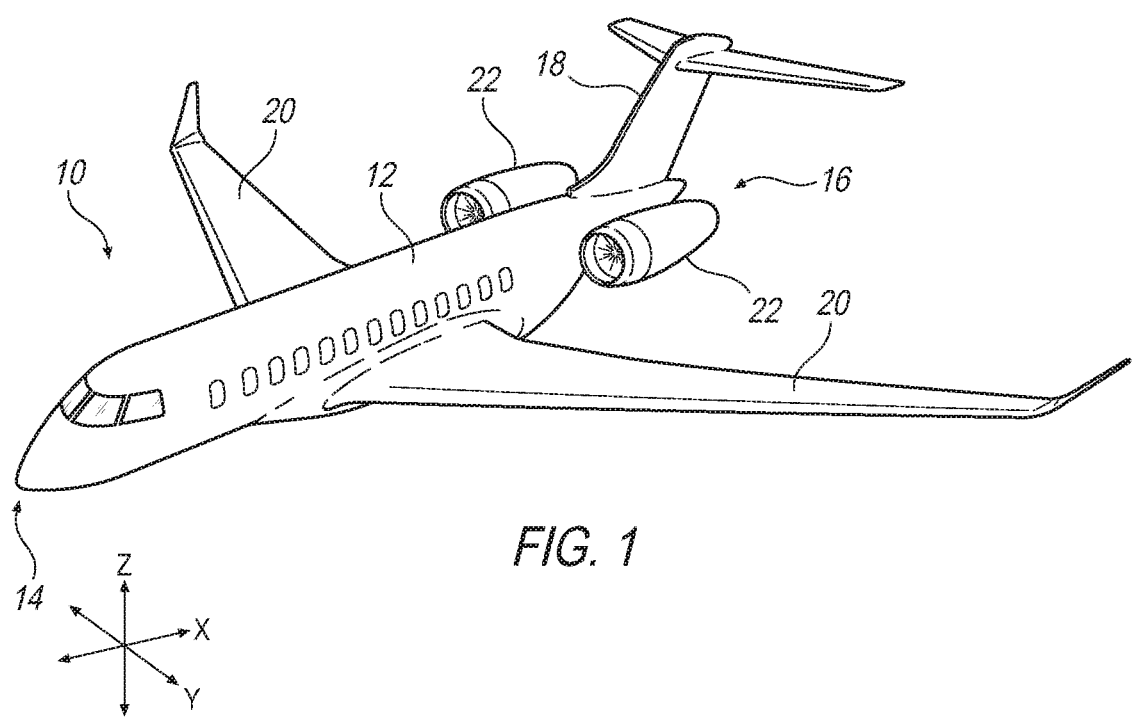
FIG. 1 illustrates an exemplary aircraft.

In the drawings, where like numerals and characters indicate like or corresponding parts throughout the several views, exemplary illustrations are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

The present disclosure relates to a frangible (e.g., deformable) attachment for releasably supporting systems, components, and/or devices of an aircraft such as a fluid conduit (e.g., a fuel line) from an aircraft support structure. In addition, the arrangements described herein address concerns related to fuel line survivability in crash events and post-crash fires due to line rupture.

The frangible attachment may be configured to distort, deform, and/or yield to ensure designed failure (e.g., controlled deformation) under a predetermined loading profile (e.g., a violent shock such as a dynamic impact resulting from an aircraft crash) so as to present a minimum hazard to the aircraft, while being able to withstand static load forces (the environmental and operational loads imposed on the mechanism during the lifetime of the attachment) during normal or expected flight conditions.

The frangible attachment may comprise a P-clamp arranged in an inverted upright (e.g., vertical) configuration to facilitate controlled deformation under a predetermined loading profile (e.g., a predetermined crash loading) and failure at a predetermined load force threshold. According to an exemplary illustration, the P-clamp has a clamp body supporting the fuel line arranged above a mounting base attached to an aircraft structure by a fastener (e.g., a stud, screw, rivet, etc.). The term "above" means that the clamp body is positioned opposite to the direction of the force of gravity when the aircraft is located on the ground. The P-clamp may be configured to withstand and resist operational and environmental static loads (e.g., weight of the line, weight of the fuel, fuel pressure, etc.). The P-clamp may yield at a connecting section between the clamp body and the mounting base when subjected to an applied load, and fail when the applied load reaches a predetermined load force threshold. The applied load may be a force applied in the vertical direction (e.g., Z-direction) under the effect of the kinetic energy produced by a violent shock such as an aircraft crash. When the P-Clamp fails, e.g., when the clamp body rotates and displaces, the attachment is more unstable and allows the fuel line to flex and deform without impacting the surrounding structure.

The controlled deformation may be influenced by structural characteristics (e.g., shape, thickness, material properties) of the P-clamp without the provision of break-away mechanisms (e.g., features such as perforations, slots, or other rupture mechanisms). Accordingly, the frangible attachment can be retrofitted into existing installations thereby achieving savings with respect to costs and installation.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or fore end) of the aircraft. The term "rear" (or its equivalent) refers to the aft end (back end or stern) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft (e.g., the X-direction, parallel to the fuselage). The term "lateral" refers to the lateral direction of the aircraft that extends from the right side to the left side of the aircraft (e.g., Y-direction, parallel to the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground (e.g., the Z-direction, parallel to the direction of gravity).

An exemplary support assembly comprising a frangible (e.g., deformable) attachment for supporting a conduit (e.g., a fuel line) from a support structure, is described herein.

According to a first aspect, there is provided a support assembly comprising a support structure and a P-clamp attached to the support structure. The P-clamp includes a clamp body defining an opening, a mounting base structured and arranged to engage the support structure, and a connecting section interconnecting the clamp body and the mounting base. The P-Clamp is arranged in an inverted upright position where the mounting base is attached to the support structure underneath the clamp body relative to a direction of gravity. The P-clamp yields at the connecting section upon an application of a load force to the clamp body.

The connecting section includes a first member interconnecting the mounting base and a first portion of the clamp body, and a second member interconnecting the mounting base and a second portion of the clamp body. The first member extends spaced apart from the second member such that a gap is defined therebetween.

The first member and the second member of the connecting section may each have a thickness less than that of the first portion and the second portion of the clamp body, respectively.

The mounting base includes a first flange connected to the first member and a second flange connected to the second member, the first flange and the second flange arranged overlaying and parallel to one another. A respective thickness of the first member and the second member may be less than a combined thickness of the first flange and the second flange.

The first member and the second member of the connecting section may each have a curved shape with a concave side facing away from the support structure.

The P-clamp has a predefined deformation characteristic under a predetermined loading profile where the connecting section bends as the load force applied to the clamp body increases and plastically deforms when the load force reaches a predetermined applied load force threshold.

According to an implementation, the P-clamp progressively deforms under the predetermined loading profile such that the clamp body is rotated away from the support structure and displaced towards the mounting base when the load force applied to the clamp body reaches the predetermined applied load force threshold.

A support member may be coupled to the support structure and engaged against the clamp body to dampen vibrations. The support member may comprise a resilient cantilever structure overhanging the clamp body, and include an outwardly extending portion running transversely to the support structure and a depending portion extending transversely from the outwardly extending portion towards the mounting base. The depending portion may be structured and arranged to apply a force against the clamp body, at least a component of the force being directed to the support structure. The support member may have a free end including an outwardly flared lip.

According to a second aspect, there is provided an aircraft comprising such a support structure, and the P-clamp is structured and arranged to support a fluid conduit suspended from the support structure in the inverted upright position under a static load three of the fluid conduit.

According to a third aspect, there is provided an aircraft fuel line installation comprising a support structure, a fuel line, and a frangible attachment operably connecting the fuel line to the support structure. The frangible attachment includes a P-clamp structured and arranged to support the fuel line from the support structure. The P-clamp includes a mounting base attached to the support structure, a circular clamp holding the fuel line suspended from the support structure, and a connecting section interconnecting the clamp body and the mounting base. The P-clamp is arranged in an inverted upright position when subjected to a static load force of the fuel line where the mounting base is disposed underneath the clamp body relative to a direction of the static load force.

The connecting section is weakened compared to that of the clamp body and the mounting base such that the connecting section bends and elastically deforms under an applied load force greater than the static load force and plastically deforms when the applied load force reaches a predetermined applied load force threshold. The connecting section may have a thickness less than that of the clamp body and the mounting base.

The P-clamp may be structured and arranged to progressively deform from an initial condition to a deformed condition under a predetermined loading profile where an applied load force progressively increases from the static load force to a predetermined applied load force threshold. The P-clamp is arranged in the inverted upright position in the initial condition, and the clamp body is rotated away from the support structure and displaced towards the mounting base in the deformed condition.

The clamp body may be rotated away from the support structure in the deformed condition by an angle of greater than 90° relative to the initial condition. Additionally or alternatively, the clamp body is rotated away from the support structure by an angle of approximately 40°-50° relative to the initial condition when the applied load force is between 35%-40% of the predetermined applied load force threshold.

A cantilever support member structured and arranged to overhang the P-clamp and resiliently engage against the clamp body to dampen vibrations. The cantilever support member is prestressed against the clamp body until the applied load forces exceeds approximately 35%-40% of the predetermined applied load force threshold.

The frangible attachment further includes a fastener received in an aperture of the mounting base and secured to the support structure. The fastener (e.g., a stud, screw, rivet, etc.) may fix the mounting base to the support structure as the P-clamp is progressively deformed from the initial condition to the deformed condition.

Implementations of the disclosure may include combinations of the above-described features. Details of these and other aspects of the disclosure will be apparent from the following discussion.

Referring now to FIG. 1, there is shown an aircraft at 10, and is generally described to illustrate some components for reference purposes in the present disclosure. Aircraft 10 may, for example, include any suitable aircraft such as corporate, private, commercial, military or any other type of aircraft. Aircraft 10 may be a fixed-wing aircraft or a rotary-wing aircraft. Aircraft 10 may be a rear engine aircraft, but it is understood that aspects of the present disclosure could also apply to aircrafts with wing-born engines. Aircraft 10 may, for example, be a narrow-body, twin engine jet airliner. It will be appreciated that other types of aircraft may be employed within the context of the present disclosure, including, but not limited to, wide-body aircraft, narrow-body aircraft, light aircraft, single-engine aircraft, twin-engine aircraft, trijet or three-engine aircraft, quadjet or four-engine aircraft, or combinations thereof. Although described within the context of an aircraft, the present disclosure may be applied to other vehicle types including, but not limited to, submersible vehicles such as a submarine, automobiles such as cars, trucks and buses, locomotives, and all-terrain vehicles.

The aircraft 10 includes a fuselage 12 longitudinally defining in the X-direction) a fore end 14 at which a cockpit may be located, and an aft end 16 supporting an empennage or tail assembly (hereafter "empennage 18"). One or more wings 20 extend laterally (e.g., in the Y-direction) from the fuselage 12. The aircraft includes one or more engines 22 that may be mounted to the fuselage 12 as shown, although one or more engines 22 may additionally or alternatively be mounted to the wings 20 and/or the empennage 18.

Figure 2:
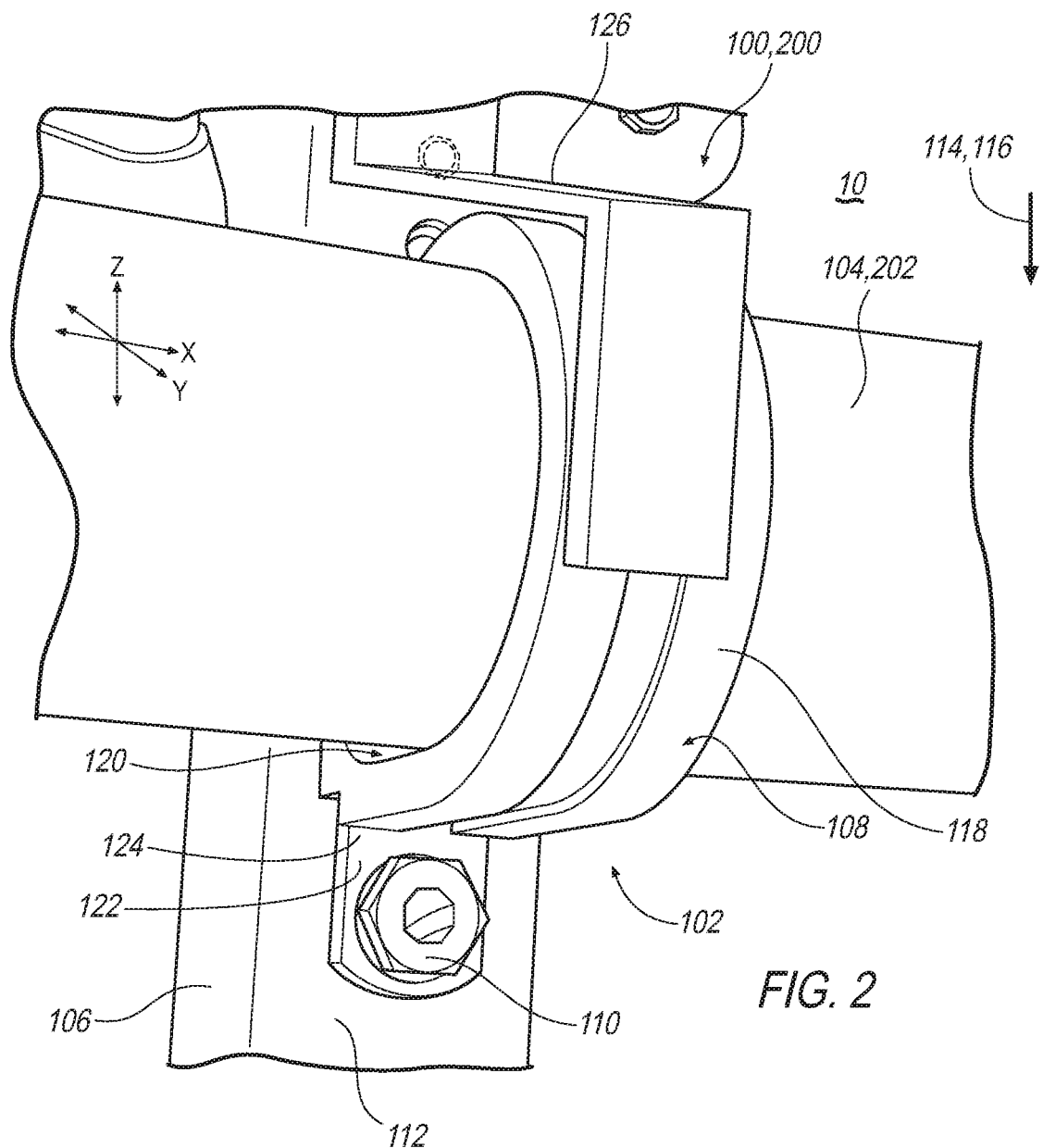
FIG. 2 illustrates a perspective view of a support assembly according to an example, which may be used in an aircraft such as shown in FIG. 1.

With reference to FIG. 2, the aircraft 10 additionally includes a support assembly 100 that may be incorporated into one or more systems and/or installations of the aircraft 10. The support assembly 100 comprises a frangible (e.g., deformable) attachment 102 for mounting components and/ or devices such as an elongated component structure 104 (e.g., a tube, conduit, etc.) to a support structure 106 of the aircraft 10. The frangible attachment 102 includes a P-clamp 108 attached to the support structure 106 by a fastener or fastener device or fastening means (hereafter "fastener 110") such as a bolt or screw or a stud or another suitable fastener. It will he appreciated that more than one P-clamp 108 may be used to mount a common elongated component structure 104 to the support structure 106, and/or that a plurality of elongated component structures 104 may be mounted to the support structure 106 via a respective P-clamp 108. The support structure 106 may be any aircraft structure or structural member(s) forming part of the fuselage 12, the empennage 18, the wings 20, and/or the engines 22. Examples of such support structures 104 include, but are not limited to, brackets, beams, ribs, spars, frames, stringers, bulkhead panels, floor panels and the like. As can he seen in FIG. 2, the support structure 106 has a support surface 112 extending in parallel to) the Z-direction, that is parallel to the direction of gravity show by arrow 114 (e.g., vertically), for receiving the frangible attachment 102. Although the support structure 106 is shown to have a rectangular shape, it is understood that the shape of the support structure 106 may vary and have, e.g., a C-shaped or L-shaped cross-section. The elongated component structure 104 may include, but is not limited to, one or more hoses, tubes, pipes, fluid conduits, fuel lines, hydraulic lines, pneumatic lines, vent lines, electrical cables and the like. The elongated component, structure 104 may extend longitudinally in the aircraft 10 (e.g., parallel to the X-direction). Although the elongated component structure 104 is shown to have a tubular shape, it will be appreciated that other shapes (e.g., rectangular) may he employed without departing from the scope of the disclosure.

Pursuant to the exemplary illustration, the support assembly 100 may be used in a fuel line installation 200 to mount a fuel line 202 (e.g., of a main fuel system or an auxiliary fuel system) of the aircraft 10. In some arrangements, the fuel line installation 200 may be employed within the fuselage 12 of the aircraft 10 where fuel travels via the fuel line 202 (e.g., a hose or tube) throughout the aircraft 10 to various aircraft systems and sub-systems. According to current airworthiness standards, each fuel line 202 within the fuselage 12 must be designed and installed to allow a reasonable degree of deformation and stretching without leakage to comply with standards of safety and crashworthiness, e.g., to reduce or eliminate hazards associated with post-crash fire in survivable crash scenarios, which have been observed at vertical descent velocities of greater than five (5) feet per second (fps). The energy from such descents and/or impact during a crash event may generate dynamic loads that may he transferred to the fuel line 202 as high load peaks comprising an intense and sudden force applied in the vertical direction (e.g., the Z-direction) under the effect of the kinetic energy. The fuel line 202 needs to be installed so that it will not impact the surrounding structure during such a survivable crash event. Otherwise, finite element analysis (FEA) indicates that the fuel line 202 may undergo a "guillotine" situation (e.g., the fuel line may be cut by surrounding structure) which can lead to fuel line failure and fuel leakage when the fuel line 202 is subjected to threshold loads. Through extensive testing and analysis, it has been shown that the frangible (e.g., deformable) attachment 102 performs in compliance with the current airworthiness standards in a repeatable and dependable manner by failing (e.g., yielding and deforming) in a controlled manner when subjected to applied loads to allow the fuel line 202 to flex and deform without impacting the surrounding structure.

The P-clamp 108 is arranged in an inverted upright configuration (e.g., an inverted vertical configuration) where the fuel line 202 (e.g., a hose or tube) is supported by the P-clamp above its point of attachment (e.g., by way of the fastener 110) to facilitate controlled deformation of the P-clamp under a predetermined loading profile (e.g., a predetermined crash loading). The P-clamp 108 may be configured to support the fuel line 202 in the inverted upright position under a static load force 116, e.g., the environmental and operational loads due to weight, fuel pressure, accelerated flight conditions and the like which are expected to occur during normal flight conditions. Further, the P-clamp 108 may be configured to yield and progressively deform in a controlled manner upon an application of a load force greater than the static load force 116 to ensure failure of the frangible attachment 102 when the load force reaches a predetermined applied load force threshold. For example, the P-clamp 108 may deform by bending, rotating, displacing, and/or otherwise changing shape to allow the fuel line 202 to flex and deform without impacting the support structure 106. The predetermined applied load force threshold may he a predetermined value that is specific to a predefined installation (e.g., a fuel line installation 200) that may vary depending on the requirements for the installation. For example, according to a non-limiting example, for a rear twin-engine aircraft the predetermined applied load force threshold may be approximately 220 lbs. (100 kg). In any case, the predetermined applied load force threshold is the threshold load (e.g., the impact force of a survivable crash event) that is transferred from the fuel line 202 to the P-clamp 108 that triggers failure or controlled deformation of the P-clamp 108 and release of the fuel line 202 so as to not impact the support structure 106.

The P-clamp 108 may be formed from a resilient material (e.g., metal such as steel or alloys thereof) to retain elasticity until the predetermined applied load force threshold has been reached. The material of the P-clamp 108 may be configured to withstand the static load force 116 of the fuel line 202 in the inverted upright position. The material of the P-clamp 108 may be further configured to plastically deform under the predetermined applied load force threshold. The P-clamp 108 may be formed from a single piece of material. The P-clamp 108 includes a clamp body 118 defining an opening 120 for receiving the fuel line 202, a mounting base 122 that engages the support structure 106, and a connecting section 124 interconnecting the clamp body 118 and the mounting base 122.

A support member 126 may be provided to overhang the P-clamp 108 and dampen vibrations generated during normal or expected flight conditions. For example, the support member 126 may be attached to the support structure 106 above the P-clamp 108 and/or the fuel line 202 and engage against the clamp body 118 to stabilize and absorb vibrations transferred from the fuel line 202. The support member 126 may be formed from a resilient material (e.g., metal such as steel and alloys thereof) that applies a force or bias against the clamp body 118 in a direction of the support structure 106 to suppress vibrations and/or restrain movement in the Y-direction (e.g., orthogonally to the support structure 106). The support member 126 may be configured to flex and yield as the load force applied to the damp body 118 increases to facilitate the controlled deformation of the P-clamp 108.

Figure 3:
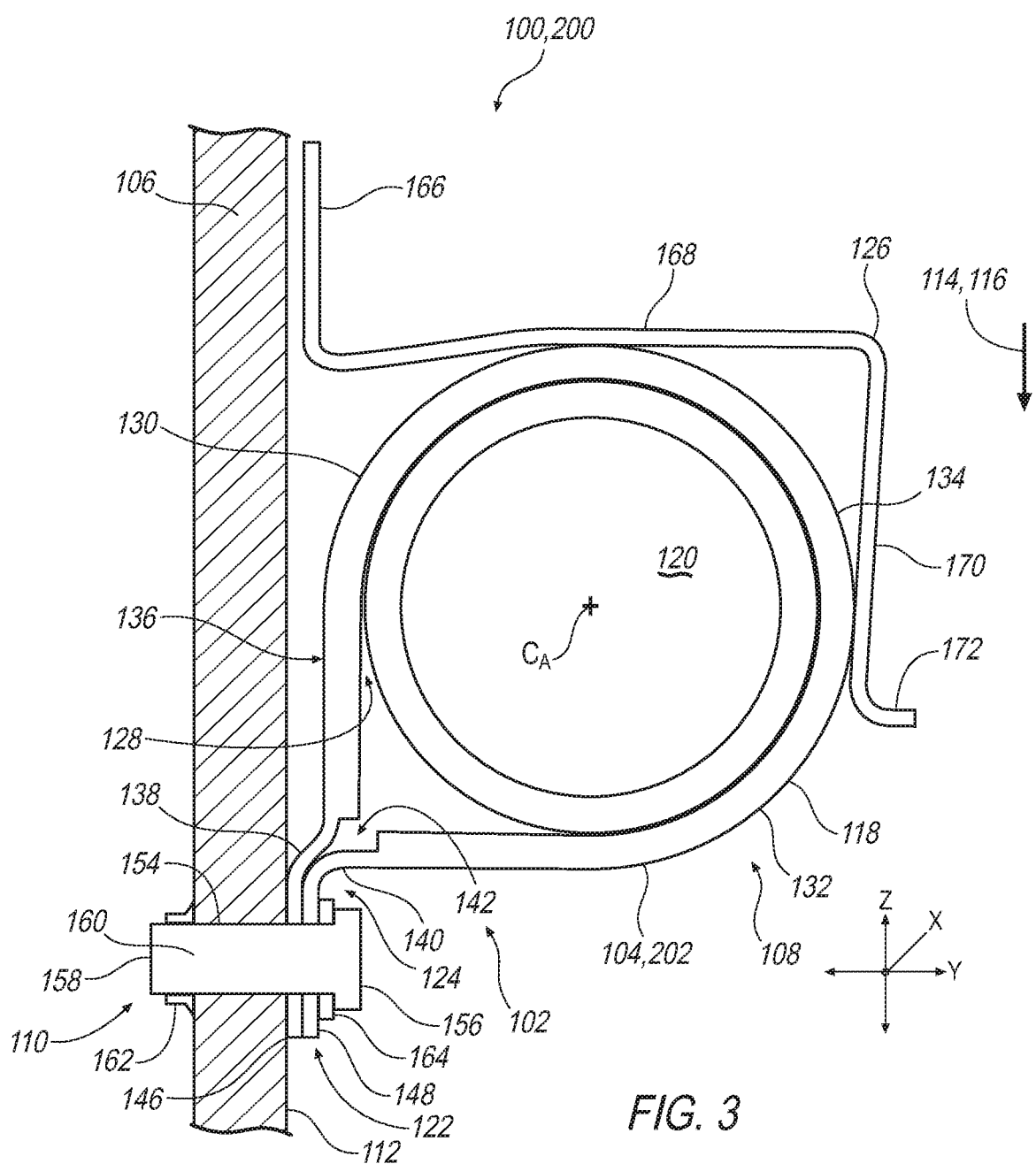
FIG. 3 illustrates a schematic cross-sectional view of the support assembly of FIG. 2, taken along lines III-III.

With reference to FIG. 3, the P-clamp 108 supports the fuel line 202 from the support structure 106 in the inverted upright position where the mounting base 122 is arranged underneath the clamp body 118 relative to a direction of gravity 114. As a result, the P-clamp 108 is configured to utilize the moment of force transferred from the fuel line 202 to bend and deform under a predetermined loading profile. For example, the clamp body 118 holds the fuel line 202 suspended from the support structure 106 with the static load of the fuel line applying a force in the Z-direction towards the mounting base as shown by arrow 116 (e.g., downwardly in the direction of gravity). Upon an application of an applied load force greater than the static load force, the P-clamp is configured to yield (e.g., bend) at the connecting section 124 for controlled deformation where the clamp body 118 rotates away from the support structure 106 and displaces towards the mounting base 122. This controlled deformation ensures compliance with the current airworthiness standards by allowing release of the fuel line 202 to flex and deform as required to not impact the surrounding structure as well as avoid a "guillotine" situation of the fuel line 202. The connecting section may be configured to resist the static load force of the fuel line 202 and retain its elasticity (e.g., elastically deform) until the applied load force reaches the predetermined applied load threshold to allow the P-clamp 108 to return to the inverted upright position if the applied load force does not reach the predetermined threshold value. Once the applied load force reaches the predetermined threshold value, the deformation of the connecting section 124 may shift from elastic to plastic deformation and thus become permanent.

Figure 4:
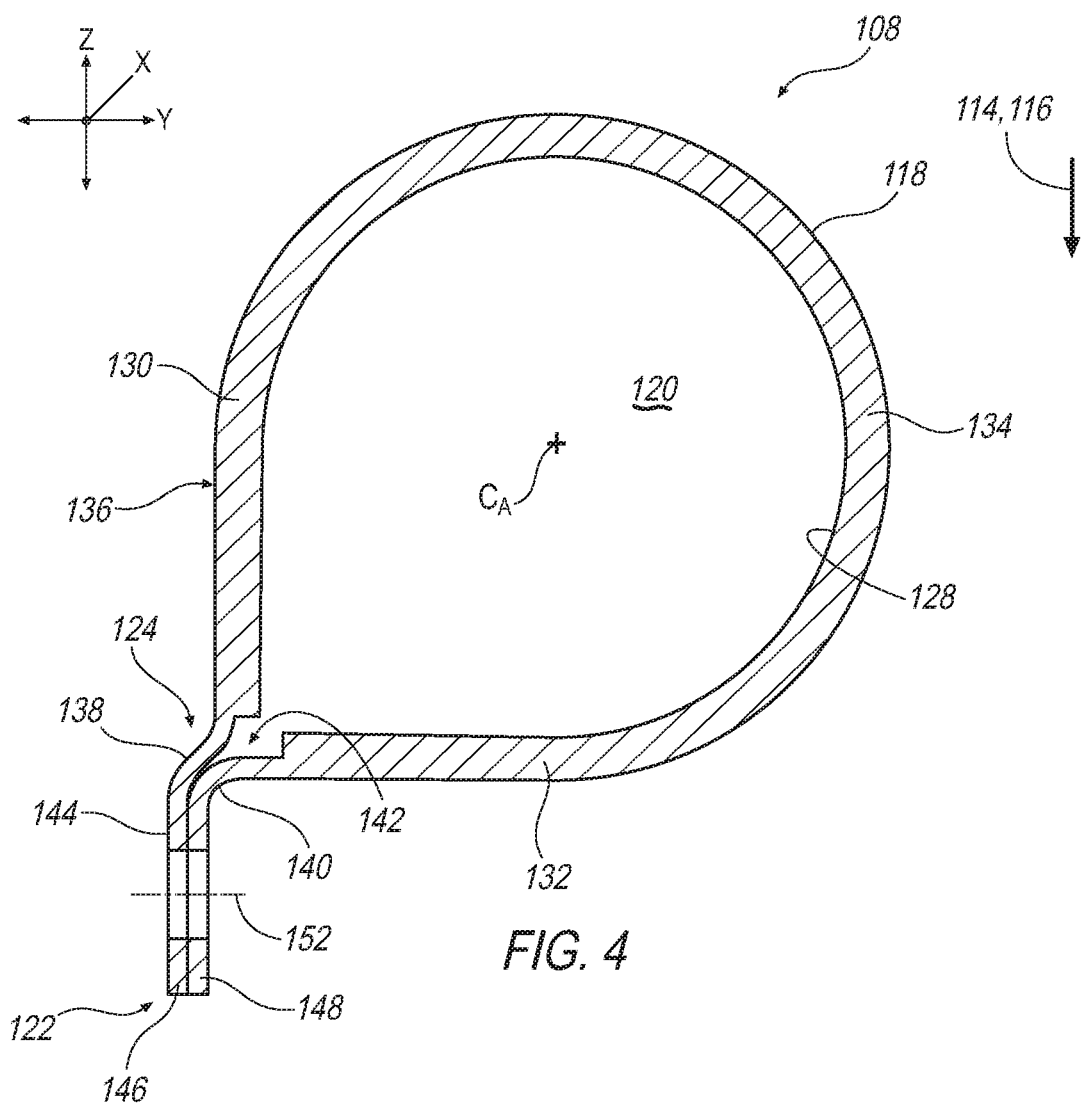
FIG. 4 illustrates a schematic cross-sectional view of an exemplary P-clamp of the support assembly of FIG. 2.

Referring to FIGS. 3 and 4, the clamp body 118 has a substantially circular clamp contour 128 (e.g., inner diameter or surface) that engages around the fuel line 202 (cf FIG. 3) and defines the opening 120 with a center axis $C_A$ oriented in the X-direction (e.g., the longitudinal direction of the fuel line 202). The clamp body 118 may comprise a first or proximal portion (hereafter "first portion 130"), a second or distal portion (hereafter "second portion 132") disposed away from the support structure 106 relative to the first portion 130, and an intermediate semicircular portion 134 interposed therebetween. The first portion 130 and the second portion 132 may extend relatively straight in the Z-direction and the Y-direction, respectively, and merge into the semicircular portion 134 to complete the clamp contour 128. The first portion 130 may be arranged at a distance spaced away from the support structure 106 so that a gap or spacing is present between a proximal surface 136 of the clamp body 118 and the support surface 112 or a plane thereof, to facilitate rotation of the clamp body 118 away from the support structure 106. The first 130, second 132, and semicircular portions 134 may respectively have a thickness and/or rigidity greater than that of the connecting section 124 to facilitate supporting the fuel line 202 and to provide a weakened region at the connecting section 124 (e.g., so that the connecting section 124 has a greater tendency to flex and deform).

The connecting section 124 extends transversely to the mounting base 122 and the clamp body 118 (e.g., obliquely to the Z-direction), and is configured to bend and facilitate displacement of the clamp body 118 in the Z-direction upon an application of the load force to the clamp body 118. The connecting section 124 may retain its elasticity (e.g., elastically deform) until the applied load force reaches the predetermined applied load threshold to allow the P-clamp 108 to return to the inverted upright position if the applied load force does not reach the predetermined threshold value. Once the applied load force reaches the predetermined threshold value, the deformation of the connecting section 124 may shift from elastic to plastic deformation and thus become permanent. The connecting section 124 includes a first or proximal member (hereafter "first member 138") interconnecting the mounting base 122 and the first portion 130 of the clamp body 118, and a second or distal member (hereafter "distal member 140") interconnecting the mounting base 122 and the second portion 132 of the clamp body 118. The first member 138 and/or the second member 140 may be formed from a solid piece of resilient material (e.g., a metal such as steel, stainless steel, or alloys thereof). The first member 138 may extend spaced apart from the second member 140 such that a gap 142 is defined therebetween.

The gap 142 may facilitate rotation of the clamp body 118 towards the mounting base 122 to facilitate controlled deformation of the P-clamp 108.

The mounting base 122 extends away from the clamp body 118 and the connecting section 124 in the Z-direction and has a mounting surface 144 that engages or abuts against the support surface 112 of the support structure 106. The mounting base 122 connects the P-clamp 108 to the support structure 106 and may be configured to hold, via the connecting section 124, the clamp body 118 with the first portion 130 arranged spaced apart from the support, structure 106, e.g., the proximal surface 136 of the first portion 130 may be arranged offset outwards along the Y-direction relative to the mounting surface 144 and/or a plane defined by the support surface 112. The provision of the gap or spacing between the proximal surface 136 and the support surface 112 or the plane thereof may help avoid impacts or collisions between the fuel line 202 and the support structure 106 may facilitate displacement of the clamp body 118 away from the support structure 106 and towards the mounting base 122 when subjected to an applied load force greater than the static load force 116. According to an implementation, the mounting surface 144 may be the only portion of the P-clamp 108 that engages, abuts, or otherwise contacts the support structure 106 to facilitate releasing the fuel line 202 to flex and deform.

The mounting base 122 may include a first or proximal flange (hereafter "first flange 146") and a second or distal flange (hereafter "second flange 148") arranged overlaying and parallel to one another. The overlaying and parallel configuration of the first and second flanges 146, 148 provides the mounting base 122 with a thickness and/or rigidity greater than that of connecting section 124 such that the weakened region of the P-clamp 108 (e.g., the connecting section 124) is interposed between the mounting base 122 and the clamp body 118 to facilitate controlled deformation and failure of frangible attachment 102.

First and second flanges 146, 148 may further extend parallel to the support surface 112 of the support structure 106 to provide a flat or flush engagement to facilitate a secure attachment to the support structure 106. A respective aperture is provided in the first and second flange 146, 148 which are axially aligned and centered about a hole axis 152, which extends parallel to the Y-direction. The apertures receive the fastener 110 axially to the hole axis 152 (e.g., in the Y-direction) to attach the P-clamp 108 to the support structure 106. The fastener 110 is accommodated in a corresponding opening 154 of the support structure 106 and may comprise a longitudinal bolt or pin extending from a head 156 to a free end 158 via a shaft 160, a nut 162 disposed at the free end 158, and a washer 164 disposed at the head 156. The longitudinal bolt may comprise a solid shaft 160 and may be made from titanium (e.g., a solid titanium bolt), although it will be appreciated that other materials such as steel may be employed without departing from the disclosure. The provision of a solid pin or shaft 160 may help ensure that the frangible attachment 102 resists the environmental and operational loads during normal flight and thus designed failure only upon reaching the predetermined applied load force threshold without premature failure.

The P-clamp 108 has structural characteristics such as geometry, thickness, and/or material properties (e.g., strength, rigidity, resilience) that provides controlled deformation under a predetermined loading profile. For example, the first member 138 may have a thickness less than that of the first flange 146 and the first portion 130, and/or the second member 140 may have a thickness less than that of the second flange 148 and the second portion 132, to facilitate controlled deformation of the P-clamp 108 at the connecting section 124. In some arrangements, the first member 138 and the second member 140 may each have a thickness that is one-third (⅓) to two-thirds (⅔), and in some circumstances one-half (½) to two-thirds (⅔), of the thickness of the respective flanges 146, 148 and support portions 130, 132 134. The reduced thickness of the first and second members 138, 140 may provide the connecting section 124 with a reduced strength and/or a reduced rigidity while being able to withstand the static load force 116 of the fuel line 202. Additionally or alternatively, the first member 138 and/or the second member 140 may have a curved shape, e.g., an arcuate cross-sectional shape, with a concave side facing away from the support structure 106 or respectively facing outwards in a direction extending orthogonally to the support surface 112 of the support structure 106 (e.g., outwards in the Y-direction). Such a curvature or curved shape of the first and/or second members 138, 140 may facilitate rotation of the clamp body 118 away from the support structure 106 and displacement in the Z-direction towards the mounting base 122. Further, the gap 142 may be disposed in a region of the curvature of the connecting section 124 and extend from the mounting base 122 to the clamp body 118 so that the first member 138 is completely separated from the second member 140. In some arrangements, the gap 142 may extend into the opening 120 and separate the first portion 130 of the clamp body 118 from the second portion 132 to allow the clamp contour 128 to shift with the fuel line 202 during displacement. The structural characteristics such as geometry, thickness, and/or mechanical properties can be adapted to suit different loading profiles for specific installations.

Referring back to FIG. 3, the support member 126 may comprise a resilient cantilever structure that provides vibration dampening and facilitates vertical displacement of the fuel line 202 towards the mounting base 122. The support member 126 may include a mounting portion 166 attached to the support structure 106, an outwardly extending portion 168 running transversely to the support structure 106 (e.g., in the Y-direction) above the clamp body 118, and a depending portion 170 extending transversely from the outwardly extending portion 168 towards the mounting base 122 (e.g., in the Z-direction). The depending portion 170 may be configured to apply a force against the clamp body 118, at least a component of the force being directed to the support structure 106, and yield to the rotation of the P-clamp 108 as the load forces applied to the clamp body 118 increase. A free end of the support member 126 (e.g., a lower end of the depending portion 170) may include an outwardly flared lip 172 to allow the P-clamp 108 to return to the inverted upright position if the predetermined applied load force threshold is not reached.

The P-clamp 108 and the support member 126 can be configured for controlled deformation under a predetermined loading profile where the applied load force progressively increases from the static load force 116 to the predetermined applied load three threshold. Controlled deformation means that, when predefined load forces are applied, the P-clamp 108 can deform according to a predetermined deformation characteristic or behavior. For example, as shown in FIGS. 5A-5E, the P-clamp 108 may be structured and arranged to progressively deform from an initial condition to a deformed condition. With reference to FIG. 3 for context, FIGS. 5A-5E show the P-clamp 108 at the initial condition and sequential stages of deformation under the predetermined loading profile (e.g., the applied load force over time during a survivable crash event).

Figure 5A:
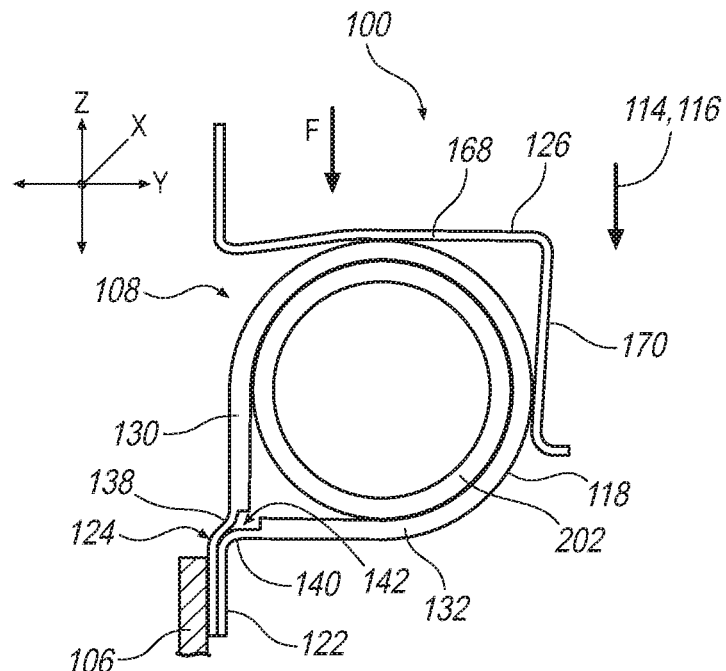
FIGS. 5A-5E illustrate schematic cross-sectional views of the support assembly according to FIG. 2, showing controlled deformation from an initial condition to a deformed condition.

FIG. 5A shows an example of the initial condition. The P-clamp 108 supports the fuel line 202 under the static load force 116 and is arranged in the inverted upright position where the clamp body 118 is arranged above the mounting base 122 relative to the Z-direction (e.g., relative to the direction of gravity 114). The first portion 130 and the second portion 132 may extend relatively straight in the Z-direction and the Y-direction, respectively. The support member 126 bears against the clamp body 118 and may apply a force directed towards the support structure 106 (e.g., transversely through the clamp body 118 in the Y-direction). In the illustrated example, both the outwardly extending portion 168 and the depending portion 170 engage against the clamp body 118, however it will be appreciated that only the depending portion 170 may engage against the clamp body 118 in the initial condition.

Figure 5B:
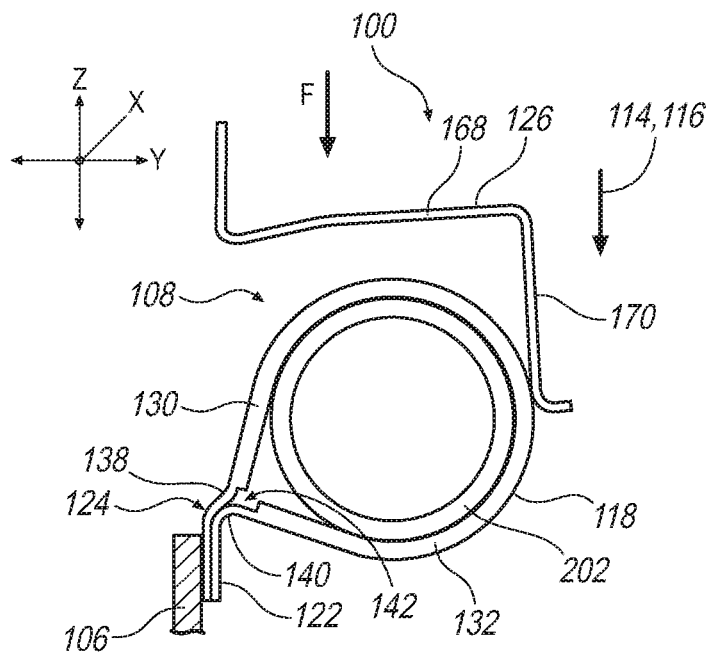

FIG. 5B shows a first stage of deformation upon an application of a load force F. The P-clamp 118 yields (e.g., bends) at the connecting section 124 under the applied load force F and the gap 142 or distance between the first member 138 and the second member 140 decreases. In the first stage, the clamp body 118 is rotated away from the support structure 106 by an angle of approximately 14°-20° relative to the initial condition and is displaced towards the mounting base 122 in the Z-direction (e.g., in the direction of gravity 114). The rotation of the clamp body 118 allows the fuel line 202 to displace vertically (e.g., in the Z-direction) as part of the controlled deformation. As the clamp body 118 rotates, the support member 126 deflects and elastically deforms while engaging against the clamp body 118 (e.g., via the depending portion 170). The support member 126 may apply a force against the clamp body 118 to restrain or impede an outward lateral movement (e.g., in the Y-direction) of the clamp body 118 relative to the support structure 106 and facilitate vertical displacement of the fuel line 202. The load force F in the first stage may amount to approximately 30-35% of the predetermined applied load force threshold.

Figure 5C:
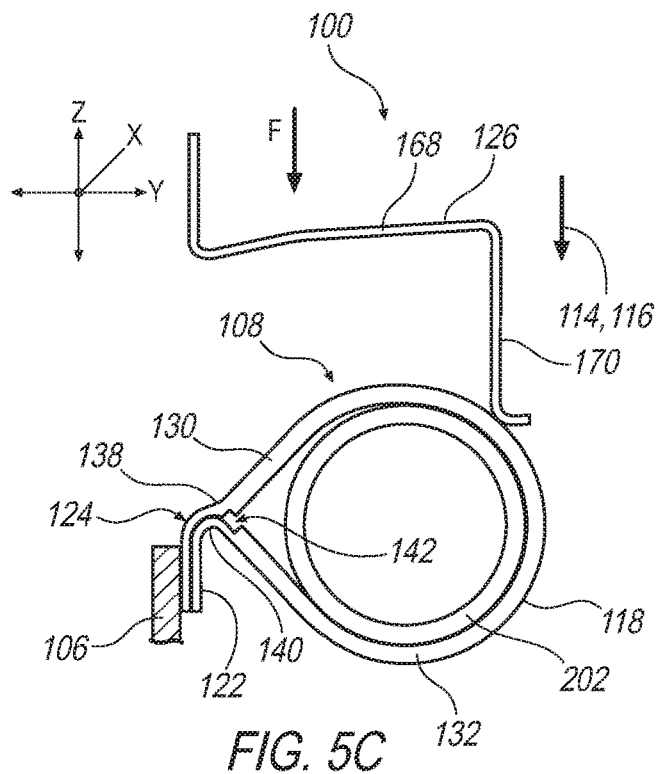

FIG. 5C shows a second stage of deformation upon an increase of the application of load force F, e.g., subsequent to the first stage. The applied load force F in the second stage may amount to greater than 35% to approximately 40% of the predetermined applied load force threshold. In the second stage, the connecting section 124 continues to elastically deform towards the mounting base 122 and may maintain a slight spacing (e.g., a relatively small gap 142) between the first member 138 and the second member 140. The clamp body 118 is rotated by an angle of approximately 40°-50° (e.g., approximately 45° as shown) relative to the initial condition and is displaced further from the inverted upright position. The support member 126 yields to the rotation of the clamp body 118 while maintaining contact with the P-clamp 108 the depending portion 170 is deflected and flexed outwardly away from the support structure 106 in the Y-direction). The support member 126 may maintain contact or engagement with the P-clamp 108 until the applied load force exceeds approximately 35%-40% of the predetermined applied load force threshold. By maintaining contact with the P-clamp (e.g., by way of the depending portion 170 engaging against the clamp body 118) until the applied load force exceeds approximately 35%-40% of the predetermined applied load force threshold, the support member 126 is able to dampen and/or absorb vibrations and oscillations of the fuel line 202 during normal flight loads, e.g., ascent and descent maneuvers, turbulent flight conditions, etc. Additionally, if the applied load force diminishes or decreases from the value of approximately 35%-40% of the predetermined applied load force threshold, the support member 126 may be configured to allow the P-clamp 108 to return to the inverted upright position upon unloading and/or may urge the P-clamp 108 into the initial condition (e.g., FIG. 5A, the inverted upright position) via the depending member 170 applying a force or bias against the clamp body 118 in a transverse direction towards the support structure 106.

Figure 5D:
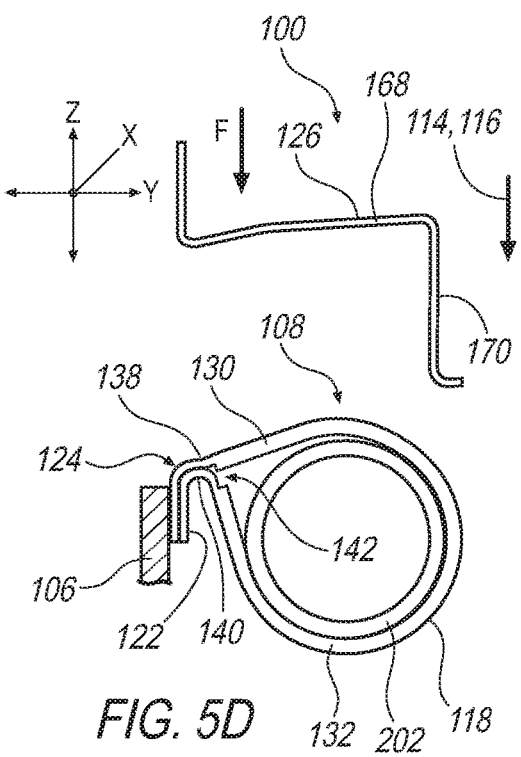

FIG. 5D shows a third stage of deformation upon a further increase of the application of load force F, e.g., subsequent to the second stage. The applied load force F in the third stage may amount to approximately 50-55% of the predetermined applied load force threshold. In the third stage, the elastic deformation of the connecting section 124 closes the gap 142 or spacing between the first member 138 and the second member 140. The clamp body 118 is rotated by an angle of approximately 70°-75° relative to the initial condition and is displaced even further from the inverted upright position than in the second stage. At this time, the support member 126 has released and disengaged from the P-clamp 108 to facilitate release of the fuel line 202 if the applied load force reaches the predetermined applied load force threshold.

Figure 5E:
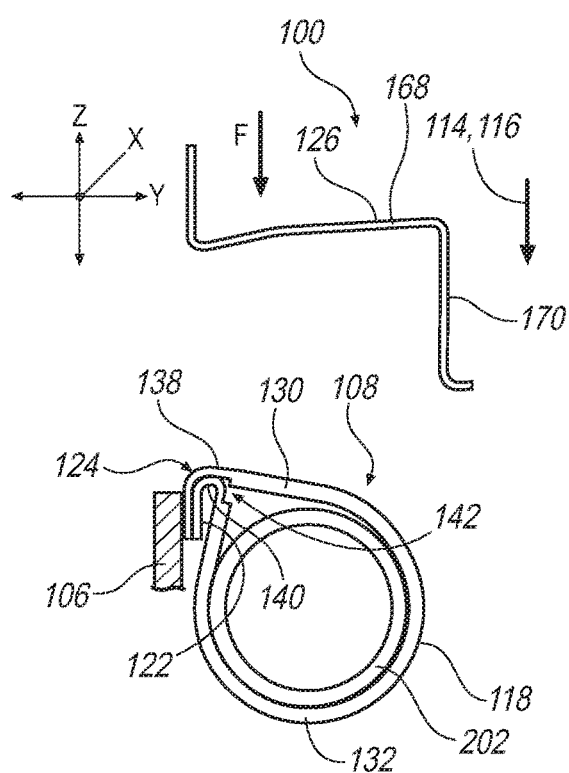

FIG. 5E shows a final stage of deformation where the applied load force reaches the predetermined applied load force threshold. Accordingly, FIG. 5E shows an exemplary failure condition of the frangible attachment 102. In the final stage, the deformation of the connecting section 124 may shift from elastic to plastic deformation. The clamp body 118 is rotated by an angle of greater than 90° relative to the initial condition, and may exceed an angle of approximately 100° relative to the initial condition, but does not rotate so far as to contact or impact the support structure 106. Accordingly, the clamp body 118 may be rotated by an angle of $90° < \alpha < 105°$. The clamp body 118 carrying the fuel line 202 is fully displaced from the inverted upright position to allow the fuel line 202 to flex and deform without impacting the support structure 106.

During the controlled deformation, the connecting section 124 bends (e.g., progressively elastically deforms) as the load force F applied to the clamp body 118 increases, and may retain its elasticity at least until the predetermined applied load force threshold is reached. The connecting section 124 may then plastically deform when or once the load force F applied to the clamp body 118 reaches the predetermined applied load force threshold. The deformation of the connecting section 124 may be influenced and/or controlled by the configuration of the first member 138 and the second member 140. For example, the thickness, material, and/or shape of the first member 138 and the second member 140 can provide certain deformation characteristics. The thickness, material, and/or shape of the first and second members 138, 140 may be selected to allow for deformation under the predetermined loading profile without plasticizing at least until the predetermined applied load force threshold is reached (e.g., the yield point of the connecting section 124 may be triggered at the predetermined applied load force threshold). Accordingly, failure of the P-clamp 108 may be ensured in compliance with current airworthiness standards without utilizing break-away features such as perforations, slots, or grooves that are commonly employed in conventional frangible clamps. This may reduce complexity and manufacturing costs as well as facilitate retrofitting the P-clamp 108 into pre-existing installations.

The P-clamp 108 remains attached to the support structure 106 during the controlled deformation via the fastener 110. In the inverted upright position (e.g., the initial condition shown in FIG. 5A), the fastener 110 secures the mounting base 122 to the support structure 106 underneath the clamp body 118 and the fuel line 202 supported therein. The fastener 110 may comprise a solid pin or shaft 160 with an anchor nut 162 or a self-locking nut 162 and fix the mounting base 122 to the support structure 106 as the P-clamp 108 is progressively deformed from the initial condition (e.g., FIG. 5A) to the deformed condition (e.g., FIG. 5E). The provision of a solid longitudinal pin as the fastener 110 may help ensure that the P-clamp 108 does not prematurely fail before the load force F reaches the predetermined applied load force threshold, and may facilitate retrofitting the frangible attachment 102 into pre-existing installations without significant modifications to the support structure 106.

It will be appreciated that the aforementioned support assembly 100 and frangible attachment 102 may be modified to have some components removed, or may have additional components added, all of which are deemed to be within the spirit of the present disclosure. For example, in some arrangements, the fastener may comprise a frangible bolt such as a hollow shear bolt rated to fail in shear upon application of the predetermined applied load force threshold to the P-clamp. The hollow shear bolt may be provided with an axial bore that may extend along the longitudinal length thereof, which may be formed by drilling (e.g., gun drilling) to provide the hollow shear bolt with a predefined shaft thickness selected to enable the bolt to fail in shear once the predetermined applied load force threshold is reached. As indicated above, however, the disclosed frangible attachment 102 may utilize a solid longitudinal pin or bolt (e.g., a solid shaft 160) as the fastener 110 to prevent premature failure and thus ensure compliance with current airworthiness standards.

As another example, in some arrangements, the connecting section may be provided with further features that facilitate the controlled deformation and/or failure of the P-clamp. For example, the connecting section may be provided with perforations (e.g., a series of openings extending through the material of the first member and/or the second member) to enable tearing or shear failure of the connecting section and allow complete release of the fuel line from the support structure (e.g., separation of the clamp body from the mounting base).

Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed assembly, device and/or article will be incorporated into such future developments. Thus, the specification and the drawings are to be regarded as an illustrative thought instead of merely restrictive thought.

As used herein, spatial or directional terms such as "inboard," outboard," "top," "bottom," "upper," "lower," "up," "down," and the like, relate to the illustrations shown in the figures and are not to be considered as limiting. Further, all numbers expressing dimensions, ratios and the like, used in the specification and claims, are to be understood to encompass tolerances and other deviations as represented by the term "about" or "approximately." For example, the term "approximately" used in connection with the angles and percentages described above is meant to encompass tolerances of ±1° and ±1%, respectively. Moreover, all ranges disclosed herein are to be understood to encompass any and all sub-ranges subsumed therein.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. As an example, the phrase "at least one of A, B and C" includes A only, B only, C only, or any combination thereof (e.g. AB, AC, BC or ABC). Additionally, use of adjectives such as first, second, etc. should be read to be interchangeable unless a claim recites an explicit limitation to the contrary.

What is claimed is:

1. A support assembly, comprising:
    a support structure;
    a P-clamp attached to the support structure, the P-clamp including:
    a clamp body defining an opening;
    a mounting base structured and arranged to engage the support structure;
    a connecting section interconnecting the clamp body and the mounting base;
    wherein the P-Clamp is arranged in an inverted upright position where the mounting base is attached to the support structure underneath the clamp body relative to a direction of gravity, and wherein the P-clamp yields at the connecting section upon an application of a load force to the clamp body equal to or greater than a predetermined applied load force threshold; and
    wherein the P-clamp has a predefined deformation characteristic under a predetermined loading profile where the connecting section bends as the load force applied to the clamp body increases and plastically deforms when the load force reaches the predetermined applied load force threshold.

2. The support assembly of claim 1, wherein the connecting section includes a first member interconnecting the mounting base and a first portion of the clamp body, and a second member interconnecting the mounting base and a second portion of the clamp body, and wherein the first member extends spaced apart from the second member such that a gap is defined therebetween.

3. The support assembly of claim 2, wherein the first member and the second member of the connecting section each have a thickness less than that of the first portion and the second portion of the clamp body, respectively.

4. The support assembly of claim 2, wherein the mounting base includes a first flange connected to the first member and a second flange connected to the second member, the first flange and the second flange arranged overlaying and parallel to one another, and wherein a respective thickness of the first member and the second member is less than a combined thickness of the first flange and the second flange.

5. The support assembly of claim 2, wherein the first member and the second member of the connecting section each have a curved shape with a concave side facing away from the support structure.

6. The support assembly of claim 1, wherein the P-clamp progressively deforms under the predetermined loading profile such that the clamp body is rotated away from the support structure and displaced towards the mounting base when the load force applied to the clamp body reaches the predetermined applied load force threshold.

7. The support assembly of claim 1, further comprising a support member coupled to the support structure and engaged against the clamp body to dampen vibrations.

8. The support assembly of claim 7, wherein the support member is a resilient cantilever structure overhanging the clamp body, and includes an outwardly extending portion running transversely to the support structure and a depending portion extending transversely from the outwardly extending portion towards the mounting base, and wherein the depending portion is structured and arranged to apply a force against the clamp body, at least a component of the force being directed to the support structure.

9. The support assembly of claim 8, wherein the support member has a free end including an outwardly flared lip.

10. An aircraft comprising the support assembly of claim 1, wherein the P-clamp is structured and arranged to support a fluid conduit suspended from the support structure in the inverted upright position under a static load force of the fluid conduit.

11. An aircraft fuel line installation, comprising:
a support structure;
a fuel line;
a frangible attachment operably connecting the fuel line to the support structure, the frangible attachment including a P-clamp structured and arranged to support the fuel line from the support structure;
the P-clamp including a mounting base attached to the support structure, a circular clamp holding the fuel line suspended from the support structure, and a connecting section interconnecting the clamp body and the mounting base;
wherein the P-clamp is arranged in an inverted upright position when subjected to a static load force of the fuel line where the mounting base is disposed underneath the clamp body relative to a direction of the static load force.

12. The aircraft fuel line installation of claim 11, wherein the connecting section is weakened compared to that of the clamp body and the mounting base such that the connecting section bends and elastically deforms under an applied load force greater than the static load force and plastically deforms when the applied load force reaches a predetermined applied load force threshold.

13. The aircraft fuel line installation of claim 12, wherein the connecting section has a thickness less than that of the clamp body and the mounting base.

14. The aircraft fuel line installation of claim 11, wherein the P-clamp is structured and arranged to progressively deform from an initial condition to a deformed condition under a predetermined loading profile where an applied load force progressively increases from the static load force to a predetermined applied load force threshold, wherein the P-clamp is in the inverted upright position in the initial condition, and the clamp body is rotated away from the support structure and displaced towards the mounting base in the deformed condition.

15. The aircraft fuel line installation of claim 14, wherein the clamp body is rotated away from the support structure in the deformed condition by an angle of greater than 90° relative to the initial condition.

16. The aircraft fuel line installation of claim 15, wherein the clamp body is rotated away from the support structure by an angle of approximately 40°-50° relative to the initial condition when the applied load force is between 35%-40% of the predetermined applied load force threshold.

17. The aircraft fuel line installation of claim 14, further comprising a cantilever support member structured and arranged to overhang the P-clamp and resiliently engage against the clamp body to dampen vibrations.

18. The aircraft fuel line installation of claim 17, wherein the cantilever support member is prestressed against the clamp body until the applied load forces exceeds approximately 35%-40% of the predetermined applied load force threshold.

19. The aircraft fuel line installation of claim 14, wherein the frangible attachment further includes a fastener received in an aperture of the mounting base and secured to the support structure, wherein the fastener fixes the mounting base to the support structure as the P-clamp is progressively deformed from the initial condition to the deformed condition.

* * * * *